United States Patent [19]

Tillac

[11] 4,223,916
[45] * Sep. 23, 1980

[54] TRACTION DEVICE FOR SAFETY BELTS

[75] Inventor: Jean-Francois Tillac, Bordeaux Cauderan, France

[73] Assignee: Societe Nationale des Poudres et Explosifs, Paris, France

[*] Notice: The portion of the term of this patent subsequent to Mar. 4, 1997, has been disclaimed.

[21] Appl. No.: 894,689

[22] Filed: Apr. 10, 1978

[30] Foreign Application Priority Data

Apr. 20, 1977 [FR] France .............................. 77 11941

[51] Int. Cl.² .......................................... B60R 21/10
[52] U.S. Cl. ................................................ 280/806
[58] Field of Search ...................... 280/744, 745, 747; 297/388, 389

[56] References Cited

U.S. PATENT DOCUMENTS

| 3,982,775 | 9/1976 | Lindblad | 280/744 |
| 4,006,644 | 2/1977 | Beier | 280/744 |
| 4,014,565 | 3/1977 | Trieni | 280/744 |

Primary Examiner—Robert R. Song
Attorney, Agent, or Firm—Bucknam and Archer

[57] ABSTRACT

Traction device for a displaceable component such as a seat belt used for protecting people in a vehicle.

The traction device according to the invention comprises drive means which comprises at least one flexible tube which is rolled up and can be expanded under the action of a pressurized fluid, and, preferably, the pressurizing component is a pyrotechnic gas generator.

Application to the production of a dynamic unit for protection by means of a safety belt which can be actuated by a collision detector is described.

22 Claims, 7 Drawing Figures

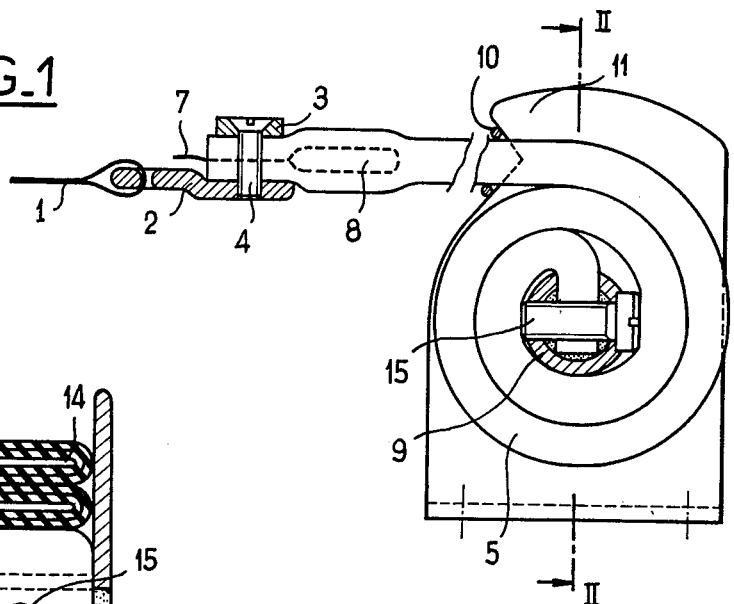
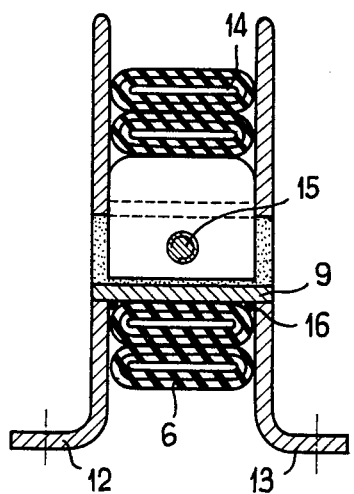
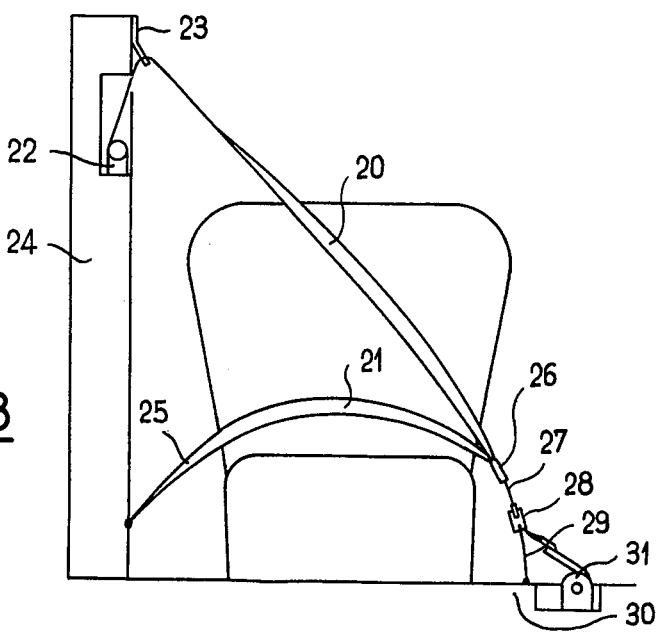

TRACTION DEVICE FOR SAFETY BELTS

The present invention relates to a traction device for a displaceable component, such as a safety belt used for protecting people in a vehicle.

Safety belt retractors have been known for several years and make it possible to tighten the safety belt, which is in contact with the person to be protected, only when a collision takes place, which allows the driver or passengers great freedom of movement, because the belts are only subjected to a small return force of the roller whilst the vehicle is under normal conditions. These retractors can be classed in two main groups: firstly, rotary retractors which wind the safety belt onto a drum, such retractors comprising either a piston and a system for converting linear motion into rotational motion, or a system for propelling the drum, which is, for example, equipped with a turbine onto which a source of pressurised fluid is discharged, and secondly, linear retractors which displace the safety belt and which comprise pyrotechnic jacks.

Figure 4:
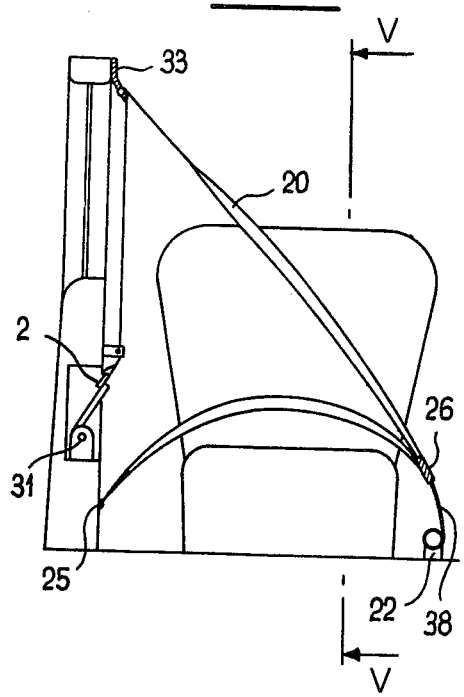

Other special types of retractor exist and there must be mentioned those belt retractors which have a pressurised deformable enclosure. Such a retractor is described, for example, in French Pat. No. 2,169,381 and is shown in FIG. 4 of this patent, an enclosure, which is initially folded flat, being arranged under the belt which is guided horizontally by two transverse rods situated on either side of this enclosure, which enclosure can be dilated by a pyrotechnic charge so as to adopt an essentially cylindrical shape, the belt being raised by the dilation of this enclosure, and the loop thus formed by the belt causing the retraction of the belt. Such a retractor has the advantage that it initially occupies a small amount of space, but it requires a large volume of gas to be generated in order to obtain an adequate retraction distance and, in order to limit this disadvantage, it is then necessary to position several of these retractors in series, which removes the advantage that the retractor initially occupies a small amount of space. Furthermore, when the enclosure is in the process of dilating, the belt, which compresses the enclosure very strongly, must be displaced and slide relative to this enclosure, this sliding being effected over a large surface area and retarding the retraction of the belt, which retraction must be effected within times of the order of 8 milliseconds.

As regards linear retractors and rotary retractors, the use of gas at high pressure gives rise to a very high operating sound level when the drive gases are ejected from these retractors, and any leakage of gas causes a significant increase in the operating sound level, even when there is no appreciable influence on the retraction characteristics. Furthermore, rollers having a pyrotechnic turbine or a nut-and-screw transmission system have a limited energy efficiency, and linear traction pyrotechnic jacks have an initial total length of about 40 cm, these dimensions considerably impeding the positioning of such a retractor in the passenger spaces of the vehicles. When the retractors use a drive means comprising a piston, the expansion chamber of the drive gases is a variable volume chamber because the piston is displaced, but since the cross-section of this piston is constant, it follows that the traction force tends to decrease rapidly during the displacement of the piston; it is possible to restrict this decrease in the force by fitting a pyrotechnic charge having an increasing surface area of combustion, but this regulation of the traction force is less than perfect, of poor reproducibility and difficult to effect.

The present invention which makes it possible to overcome these disadvantages has the particular aim of producing a traction device which can be used as a safety belt retractor, occupies a small amount of space, has a high energy efficiency, does not expel any combustion gas and operates at a low sound level. The invention results in a particularly simple device having a low cost, because there is no piece which requires precise machining, in particular the drive means which can be a commercially available element without any adaptation, the particular characteristics of this drive means moreover leading to automatic regulation of the traction force which results from the increase in the effective area of traction when the volume of the expansion chamber increases.

Since the retractor according to the invention does not belong to the two groups of retractors previously known, its particular construction characteristics and its particular operating characteristics result in the fact that it is operated in accordance with particular techniques so as to form a dynamic unit for protection by means of a safety belt which can be actuated by a collision detector, and the invention therefore also relates to the applications of the traction device to safety belts.

The advantages gained, both in terms of the traction device and in terms of the application, require that the traction device, which comprises, on the one hand, a frame firmly held to the vehicle, and, on the other hand, a movable element firmly held to a displaceable component, between which a drive means is placed which ensures the displacement of the said element, should be characterised in that the drive means comprises at least one flexible tube which is rolled up so as to have a reduced cross-section and which can be expanded under the action of a pressurised fluid, this tube being connected at not less than two different portions, on the one hand to the same frame and on the other hand to the said movable element, and this tube being joined to a pressurising component.

For the applications to the retraction of a safety belt, the movable element is a buckle for fixing the belt, the pressurised fluid is a gas and the pressurising component is a gas generator, especially a pyrotechnic gas generator which can even be arranged directly inside the flexible tube, this generator then being ignited electrically.

The flexible tube advantageously comprises at least one metal wall to allow high pressure operation, and this tube can be entirely made of metal and can comprise, for example, two laterally welded strips, an embodiment of this type resulting in a traction device which occupies a small amount of space, but the expansion of the cross-section of which is restricted because of the mechanical characteristics of the metal. In order to allow a large expansion of the cross-section, the flexible tube comprises at least one wall made of a rubbery material or a plastic and, more particularly, the flexible tube comprises one wall made of braided metal wires, this wall being covered on the inside by a wall made of a rubbery material or a plastic.

At least one of the different attachment portions of the flexible tube is preferably situated towards one of the ends of this flexible tube, and the drive means preferably comprises only a single flexible tube which is rolled up in a spiral, it being possible for this spiral to be rolled around an axle which is part of the frame, the frame being prevented from rotating by being firmly held to a fixed chassis, such as the chassis of a vehicle.

The retraction length becomes greater as the number of turns increases, the mean winding diameter of a pressurised turn depending not only on the dilation of the cross-section of the flexible tube, but also on the number of turns present between the central axle and this turn, these inner turns themselves being dilated. Rolling in a spiral therefore makes it possible to amplify the retraction relative to rolling in a helix, and it is therefore of advantage if the spiral comprises at least one and a half turns; however, when the traction forces are very large and the flexible tube has a small cross-section, the friction forces are no longer by any means negligible and impede the expansion of the inner turns, and it can therefore be of value either to reduce the spiral to a single turn when the retraction length is small, or to use a means for reducing friction, such as an outer coating on the flexible tube or such as a sliding band between the turns, it being possible for this band to be made of a material having a low coefficient of friction or to comprise bearing elements such as needles.

The drive means, which essentially comprises the flexible tube, can be rendered irreversible insofar as this means comprising a uni-directional blocking component which makes it possible for the frame and the movable element to move relative to one another when the tube is pressurised by fluid. The drive means can also be rendered partially reversible insofar as it comprises a uni-directional component for absorption of energy, which makes it possible, after the flexible tube has been pressurised by fluid, for the movable element to return to its initial position before the flexible tube was pressurised by fluid.

The preferred application of the traction device according to the invention relates to the production of a unit for protection by means of a safety belt, which can be used especially in motor cars and which comprises at least one safety belt connected to this traction device, which device is actuated by a collision detector. The safety belt is advantageously equipped with an inertia-blocked winder-unwinder, and the safety belt is preferably equipped with a non-return buckle constituting a uni-directional locking component which can be substituted for a component of this type placed at the level of the drive means. According to a particular configuration, the non-return buckle is fixed to the chassis of the vehicle and the portion of the belt in which the end is firmly held to the traction device passes through this buckle. According to another preferred configuration, the non-return buckle is held to the chassis of the vehicle by one of the ends of a flexible attachment which passes through this buckle connected to the safety belt, the other end of this flexible attachment being firmly held to the traction device.

Figure 5:
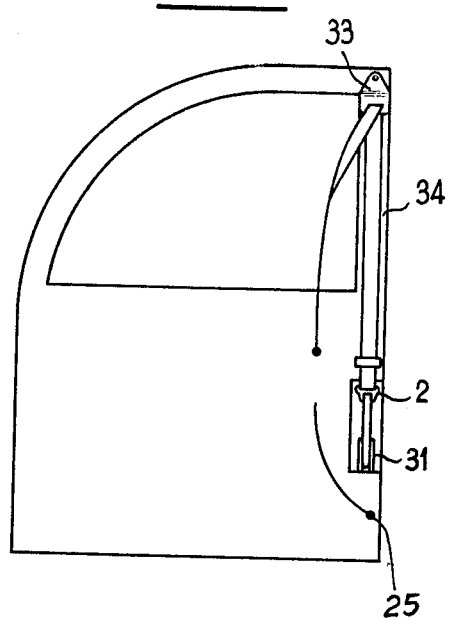
Figure 6:
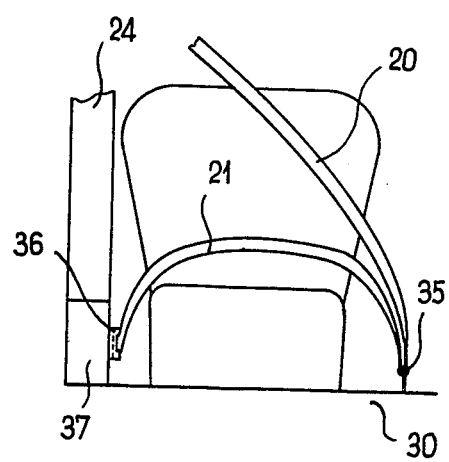
Figure 7:
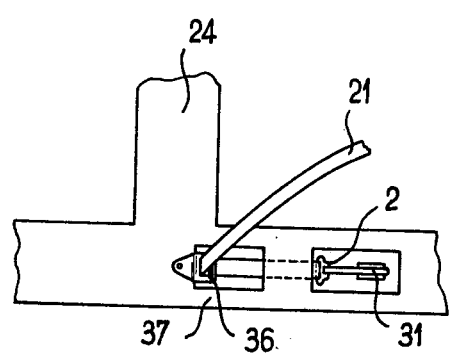

Other characteristics and advantages of the invention are clarified by the following description which refers to the attached drawing in which:

FIG. 1 is a view, in partial longitudinal cross-section, of a retraction device according to the invention, FIG. 2 is a view, in transverse cross-section along II, II of the device shown in FIG. 1, FIG. 3 is a schematic front view of a first dynamic protection unit using a retraction device according to the invention, FIG. 4 is a schematic front view of a second dynamic protection unit using a retraction device according to the invention, FIG. 5 is a schematic side view of the second dynamic protection unit shown in FIG. 4, FIG. 6 is a schematic front view of a third dynamic protection unit using a retraction device according to the invention, and FIG. 7 is a schematic partial side view of the third dynamic protection unit shown in FIG. 6.

The traction device shown in FIGS. 1 and 2 is intended to retract the safety belt (1) which is fixed to the fastening buckle (2), onto which a clamp (3) having a central screw (4) is joined, which clamp encloses the end of the flexible tube (5) comprising a metal wall (6) forming a central core wich is covered on the inside and outside with a layer of neoprene rubber. A tube having a structure of this type is in itself known and it can withstand pressures of several hundred bars. The normal cross-section is circular, but this tube is sufficiently flexible to be flattened so that the inner surface closes in on itself, which makes it possible to obtain absolute leaktightness at high pressure, despite the flat conducting wires (7) which pass through that end of this tube which is enclosed by the clamp (3). The wires connect the collision detector (not shown) to the pyrotechnic gas generator (8) which is placed inside the tube and which consists of an ultra-rapid ignition apparatus, one gram of ignition powder containing zirconium and two and a half grams of powder containing nitrocellulose, the whole being contained in a holder. The other end of the flexible tube is firmly held to a central tubular axle (9) and the greater part of the length of the tube is rolled up in a spiral under axial stress, so as to totally flatten the tube in order that the locking clip (10) fixed to the flexible tube can pass over the projection (11) for preventing the movement of the two plates (12) and (13) of the frame, the tube forming two turns of flattened cross-section, providing only one inner passage reduced to a thin oblong opening (14) having a free height of one millimeter, and being held in a rolled up position by the wedging of this low-strength locking clip which rests on the two V-shaped cut-away sections of the plates (12) and (13). The inner end of the flexible tube passes through a slit in the central tubular axle (9) and is sealed by pinching this axle by means of the screw (15). The central tubular axle passes into the two plates through a circular opening comprising a projection corresponding to the slit in the tubular axle, which axle is locally fixed to the two plates by two welds (16) situated opposite the slit in order to provide the elasticity, for this axle, which is necessary for pinching the flexible tube.

In operation, when the collision detector sends an electrical impulse to the conductors (7), the pyrotechnic generator (8) evolves, at high temperature, an amount of gas which makes it possible to create a pressure of 200 bars in the flexible tube having an internal diameter of nineteen millimeters, but, as soon as this pressure reaches a value of 30 bars, the locking clip (10) is broken and the tube retracts because, as the tube tends to resume its equilibrium circular cross-section, the increase in the radius of each point of the mean fibre of the turns determines the traction of the fastening buckle (2). The increases in volume and in effective internal cross-section, together with the increase in pressure, develop a large amount of energy which makes it possible to obtain essentially constant traction forces of more than 350 decaNewtons. As the turns of the flexible tube are only guided transversely by the two plates (12) and (13), the pressure in the tube is advantageously set as a function of the traction force, so that, after retraction, the cross-section of the turns comprises a flattened zone which enables these turns to be better superposed. When the turns of the flexible tube must resume a circular cross-section, in order to obtain a maximum retraction length, it is then advantageous either to provide side plates, having the general shape of a truncated cone, in order to ensure the centering of the outer turns, or to decrease the distance of separation of the plates at the same time as the flexible tube dilates. For such traction forces, if the internal diameter of the tube is less than twenty millimeters and if this tube is rolled around a twenty millimeter central tubular axle, the expansion of the inner turn of the flexible tube is very incomplete and it is then advantageous either to limit the rolling to one turn, which makes it possible to obtain a retraction length of the order of seventy-five millimeters, or to increase the diameters or use a sliding band inserted between the turns.

A different embodiment of the traction device shown in FIGS. 1 and 2 can consist in placing the pyrotechnic gas generator inside that end of the tube which is firmly held to the central tubular axle (9), the cavity which remains in the end being sealed by means of a thermosetting resin which plays a part in increasing the leak-tightness of this end of the flexible tube.

The application of the retractor shown in FIGS. 1 and 2 is described with reference to FIGS. 3 to 7 which show three variants of dynamic units for protection by means of a seat belt comprising two main portions (20) and (21) which are situated across the chest and across the abdomen, respectively, a configuration of this kind usually being denoted by the term "three point belts." These three variants use rollers (22) which are in themselves known and can be, for example, of the spiral spring type, the drum for winding up the belt being held back by the spring and equipped with a wheel having dissymmetrical notches in which a ratchet, controlled by a deadweight, can be engaged.

According to FIG. 3, the dynamic protection unit uses a belt, the upper part of the chest portion of which passes through the guiding buckle (23) which is firmly held to the vertical pillar (24) situated behind the front door of the vehicle, and is fixed to the drum of the roller (22), and the lower outer end (25) of which belt is fixed directly to the same vertical pillar. The joining zone of the two portions is engaged in the guiding and fastening buckle (26) which is connected by means of a flexible connection (27) to a non-return buckle (28) through which a cable (29) passes, one end of which cable is fixed to the floor (30) of the vehicle, and the other end of which is firmly held to the traction device (31) according to the invention, the two plates (12) and (13) of the frame of this device being screwed to the floor of the vehicle.

During the normal operation of the vehicle, the two portions of the belt can be displaced slowly, the belt being unwound from the winding drum of the roller and being constantly pressed, by means of the return spring of the roller, against the person to be protected. When a collision takes place, the rotation of the belt roller (22) is blocked and the detector (not shown) which can be, for example, inertia-operated, fires the pyrotechnic generator which causes the retraction of the device (31), the flexible tube of which pulls the non-return buckle (28) and guiding buckle (23) assembly by means of the displacement of the cable (29). Such a configuration is particularly advantageous because it makes it possible to only subject the roller to the traction force developed by the single chest portion, to limit the traction force of the device according to the invention, this force essentially corresponding to half of the force resulting from the tractions in the abdominal and chest portions, to make it easier to balance the tension in the two portions of the belt, and to use a small non-return buckle.

According to FIGS. 4 and 5, the dynamic protection unit uses a belt, the upper part of the chest portion (20) of which passes through the non-return buckle (33) which is firmly held to the rear frame (34) of the front door of the vehicle, and is fixed to the fastening buckle (2) of the traction device (31) placed inside this door, which makes it possible to clear the belt away from the seat when the door is open, the roller (22) having a sufficiently long strap (38) to enable the belt to be cleared away. The lower outer end (25) is fixed directly to the chassis of the door, and the joining zone of the two portions is engaged in the fastening and guiding buckle (26) which is connected to the roller (22), this fastening function not normally being used by the person to be protected who occupies the seat which has an automatic belt release.

According to FIGS. 6 and 7, the dynamic protection unit uses a belt, the upper part of the chest portion (20) of which passes through a guiding buckle which is firmly held to the vertical pillar (24) situated behind the front door of the vehicle, and is fixed to the drum of a roller. The joining zone of the two portions is formed by a guiding buckle (35) which constitutes one of the elements which fastens the belt and which can be engaged in the second fastening element which is firmly held to the floor (30) of the vehicle. The outer end of the abdominal portion (21) is passed through a non-return buckle (36) which is firmly held to the chassis of the vehicle, and this end is fixed to the buckle (2) of the traction device (31) which is placed inside the lower pillar (37).

I claim:

1. Traction device for a displaceable component such as a safety belt used for protecting people in a vehicle, comprising a fixed frame which is firmly held to the fixed chassis of the vehicle, a movable element which is firmly held to the displaceable component, drive means firmly connected to said movable element which ensures the displacement of the said movable element, the drive means comprising at least one flexible tube which is rolled up so as to have a reduced cross-section, a pressurized fluid responsive to a collision detector, means for pressurizing said fluid and for setting said collision detector in operation, said tube being expandable under the action of said pressurised fluid, said flexible tube being connected at not less than two different portions, on the one hand being connected to and being trained around an axle which is connected to the said fixed frame, and on the other hand to the said movable element.

2. Traction device according to claim 1, wherein the pressurised fluid is a gas.

3. Traction device according to claim 1, wherein the means for pressurizing said fluid is a gas generator.

4. Traction device according to claim 3, wherein the generator is a pyrotechnic gas generator.

5. Traction device according to claim 4, wherein the pyrotechnical gas generator is arranged inside the flexible tube, said pyrotechnic generator being ignited electrically.

6. Traction device according to claim 1 wherein the flexible tube comprises at least one metal wall.

7. Traction device according to claim 1, wherein the flexible tube comprises at least one wall made of a rubbery material or a plastic.

8. Traction device according to claim 1, wherein the flexible tube comprises a wall made of braided metal wires, siad wall being covered on the inside by a wall made of a rubbery material or a plastic.

9. Traction device according to claim 1, wherein at least one of the different attachment portions of the flexible tube is situated towards one of the ends of said flexible tube.

10. Traction device according to claim 1, wherein the drive means comprises only a single flexible tube.

11. Traction device according to claim 1, wherein the flexible tube is rolled up in a spiral.

12. Device according to claim 1, wherein the flexible tube is rolled around an axle which is part of the frame.

13. Traction device according to claim 4, wherein the flexible tube comprises at least one and a half turns equipped with a means for reducing friction.

14. Traction device according to claim 1, wherein the frame is prevented from rotating by being firmly held to a fixed chassis.

15. Traction device according to claim 1, wherein the drive means is irreversible and comprises a uni-directional blocking component which makes it possible for the frame and the movable element to move relative to one another when the tube is pressurised by fluid.

16. Traction device according to claim 1, wherein the drive means is partially reversible and comprises a uni-directional component for absorption of energy, which makes it possible, after the flexible tube has been pressurised by fluid, for the movable element to return to its initial position before the flexible tube was pressurised by fluid.

17. Traction device according to claim 1, wherein the movable element is a buckle for fixing a belt.

18. The method of protecting an individual in a vehicle by means of a safety belt, which comprises a traction device connected to said safety belt, a collision detector capable of actuating said traction device, said traction device comprising a frame which is firmly held to the vehicle, a movable element which is firmly held to the safety belt, drive means between the frame and the movable element which ensures the displacement of the said movable element, the drive means comprising at least one flexible tube which is rolled up so as to have a reduced cross-section and is expandable under the action of a pressurised fluid, said flexible tube being connected at not less than two different portions, on the one hand to the said frame, and on the other hand to the said movable element, said flexible tube being joined to a pressurising component.

19. The method according to claim 18, wherein the safety belt is equipped with an inertia-blocked winder-unwinder.

20. The method according to claim 18, wherein the safety belt is equipped with a non-return buckle.

21. The method according to claim 20, wherein the non-return buckle is fixed to the chassis of the vehicle, and the portion of the belt in which the end is firmly held to the traction device passes through said buckle.

22. The method according to claim 20, wherein the non-return buckle is held to the chassis of the vehicle by one of the ends of a flexible attachment which passes through said buckle connected to the safety belt, the other end of said flexible attachment being firmly held to the traction device.

* * * * *